United States Patent
Liu et al.

(10) Patent No.: US 9,847,193 B2
(45) Date of Patent: Dec. 19, 2017

(54) ILLUMINANT KEYBOARD AND MANUFACTURING METHOD THEREOF

(71) Applicant: Darfon Electronics Corp., Taoyuan (TW)

(72) Inventors: Hsin-Hung Liu, Taoyuan (TW); Pen-Hui Liao, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 249 days.

(21) Appl. No.: 14/979,502

(22) Filed: Dec. 27, 2015

(65) Prior Publication Data

US 2016/0189892 A1    Jun. 30, 2016

(30) Foreign Application Priority Data

Dec. 26, 2014  (TW) .............................. 103145641 A (51) Int. Cl.
*H01H 13/83*    (2006.01)
*G06F 3/02*     (2006.01)
*H01H 3/12*     (2006.01)

(52) U.S. Cl.
CPC .......... *H01H 13/83* (2013.01); *G06F 3/0202* (2013.01); *H01H 3/125* (2013.01); *H01H 2219/044* (2013.01); *H01H 2219/058* (2013.01); *H01H 2219/062* (2013.01); *H01H 2219/064* (2013.01); *H01H 2219/0622* (2013.01)

(58) Field of Classification Search
CPC .. H01H 13/83; H01H 3/125; H01H 2219/058; H01H 2219/062; H01H 2219/0622; H01H 2219/064; G06F 3/0202
See application file for complete search history.

(56) References Cited

U.S. PATENT DOCUMENTS

2011/0181974 A1   7/2011  Hori
2014/0166455 A1*  6/2014  Chen ..................... H03K 17/98
                                                             200/5 A

FOREIGN PATENT DOCUMENTS

CN    102165336 A    8/2011
TW    201209872 A    3/2012
TW    201426803 A    7/2014

OTHER PUBLICATIONS

Office Action of counterpart application by Taiwan IP Office dated Sep. 16, 2015.

* cited by examiner

*Primary Examiner* — Mary Ellen Bowman (57) ABSTRACT

An illuminant keyboard and a method thereof are provided. A plurality of protruding walls substantially parallel to each other are disposed on one of an upper surface of the transparent plate, a lower surface of the transparent plate and an upper surface of the planar light source. The protruding walls may be either I-shaped, L-shaped, U-shaped or square-shaped. When the protruding walls are made of an opaque material, the protruding walls can effectively reduce the intensity of the halo light surrounding a transparent keycap. When the protruding walls are made of a transparent material with a designated color, the halo light surrounding the keycap will be modulated with the designated color.

20 Claims, 5 Drawing Sheets

FIG. 8

ILLUMINANT KEYBOARD AND MANUFACTURING METHOD THEREOF

This application claims the benefit of Taiwan application Serial No. 103145641, filed Dec. 26, 2014, the subject matter of which is incorporated herein by reference.

BACKGROUND

Technical Field

The invention relates in general to an illuminant keyboard and manufacturing method thereof, and more particularly to an illuminant keyboard capable of substantially reducing the intensity of the light exiting from the area surrounding the transparent keycap and a manufacturing method thereof.

Description of the Related Art

Keyboard is an indispensable accessory to computers. Each keycap on the keyboard is marked with a symbol for identification purpose. When operating the keyboard in an environment with insufficient illumination, there will be difficulty with the operation of the keyboard if the symbol on each keycap of the keyboard cannot be clearly identified.

To resolve the above problem, an illuminant keyboard is provided. Currently, the illuminant keyboard includes transparent keycaps, a base plate and a light source disposed in a top down manner. Each transparent keycap has a keycap pattern, and is indirectly disposed on the base plate, and a light traveling gap is formed between the transparent keycap and the base plate. The light provided by the light source may pass through the base plate and reach the transparent keycap and the light traveling gap, and further makes the keycap pattern of the transparent keycap illuminate. When the user is in an environment with insufficient illumination, the user is still capable of identifying the illuminant symbol on the transparent keycap.

In general, the identification effect of the keycap pattern is positively proportional to the intensity of the light proceeding to the transparent keycap. Therefore, the designers of illuminant keyboard all try their best to increase the intensity of the light proceeding to the transparent keycap. However, when the intensity of the light proceeding to the transparent keycap is increased, the intensity of the light proceeding to the light traveling gap also increases. At the same time, the light with high intensity will exit from the area surrounding the transparent keycap and the overall visual effect of the illuminant keyboard will be deteriorated. To the worse, it is possible to interfere with the keyboard user when viewing the transparent keycap.

Therefore, how to reduce the intensity of the light exiting from the area surrounding the transparent keycap so as to increase the overall visual effect of the illuminant keyboard has become a challenge to the industries.

SUMMARY

In view of the problems encountered in the prior art, the present invention provides an illuminant keyboard including a base plate, a transparent keycap, a light source (or a planar light source), a transparent plate and a plurality of protruding walls. The transparent keycap is disposed above the base plate and a space formed therebetween. A first light traveling gap towards an area surrounding the transparent keycap is formed within the space. The light source is capable of emitting a first light substantially proceeding towards the transparent keycap, and a second light substantially proceeding towards the first light traveling gap. The transparent plate is disposed between the light source and the transparent keycap. The transparent plate comprises a transparent region allowing the first light and the second light to pass through. The transparent region is located within the vertical projection area of the transparent keycap on the transparent plate and comprises a first boundary. A plurality of protruding walls are disposed within the transparent region or disposed on the planar light source right under the transparent region. Each protruding wall comprises a first wall. The first walls are substantially parallel to each other and neighboring to the first boundary. Two of the adjacent protruding walls most neighboring to each other are disposed with an interval to form a second light traveling gap. The intensity of the second light will be reduced by the first walls when the second light proceeding proceeds from the light source towards the first light traveling gap. The first light reaches the transparent keycap through the second light traveling gap without intersecting the first walls.

Additionally, the present invention further provides a method for manufacturing illuminant keyboard. The method comprises following steps: Coating a UV adhesive layer on the transparent plate (or the planar light source). Sequentially performing a rubbing treatment and a curing treatment on the UV adhesive to form the protruding walls on the transparent plate (or the planar light source).

Optionally, the protruding walls are made of a UV adhesive and comprise a color, such that the light passing through the protruding walls will be modulated with a designated color. The height of each protruding wall is between 10-50 µm. The interval between adjacent protruding walls is between 10-50 µm.

Optionally, the protruding walls may be I-shaped (or 1-shaped), L-shaped, U-shaped or square-shaped. The protruding walls can completely reduce the intensity of the second light. The planar light source comprises a transparent prism located in the second light traveling gap between adjacent protruding walls for changing the direction of the light passing through the transparent prism to substantially proceeding towards the keycap pattern of the transparent keycap.

Optionally, the illuminant keyboard comprises a keyboard frame comprising a receiving hole in which the transparent keycap can move. The transparent keycap and the keyboard frame are separated by a movable gap, and part of the second light proceeding towards the first light traveling gap will pass through the movable gap and exit to the outside.

In comparison to the prior art, the illuminant keyboard of the present invention comprises a plurality of protruding walls substantially parallel to each other and disposed on one of an upper surface of the transparent plate, a lower surface of the transparent plate and an upper surface of the planar light source for reducing the intensity of the light proceeding towards the area surrounding the transparent keycap, so as to increase the visual effect of the illuminant keyboard. The protruding walls may be either I-shaped, L-shaped, U-shaped or square-shaped. When the protruding walls are made of a transparent material with a designated color, the halo light surrounding the keycap will be modulated with the designated color. When the protruding walls are made of an opaque material, the intensity of the halo light surrounding a transparent keycap will be largely reduced, such that the illuminant keyboard will produce special visual effect to meet the requirements.

The above and other aspects of the invention will become better understood with regard to the following detailed description of the preferred but non-limiting embodiment(s). The following description is made with reference to the accompanying drawings.

DETAILED DESCRIPTION

The technical content of the present invention is disclosed below in a number of embodiments with accompanying drawings. Any person ordinary skilled in the technology of the present invention can easily understand the advantages and effects of the present invention through the specification. The present invention can also be implemented or applied in other embodiments. Based on different viewpoints and applications, modifications and adjustments, without violating the spirit of the present invention, can be made to detailed descriptions of the specification. Particularly, the scale relationships and relative positions between the components illustrated in the drawings are for exemplary and explanatory purposes only, not for representing actual implementation of the present invention.

The present invention mainly provides an illuminant keyboard to resolve the problem of poor visual effect, which occurs when the light with high intensity is emitted from the area surrounding a transparent keycap of the keyboard. The illuminant keyboard has a first side, and the transparent keycap of the illuminant keyboard has a transparent keycap pattern. When the user operates the illuminant keyboard from the first side, the user will be able to view the keycap pattern from a correct angle.

Figure 1:
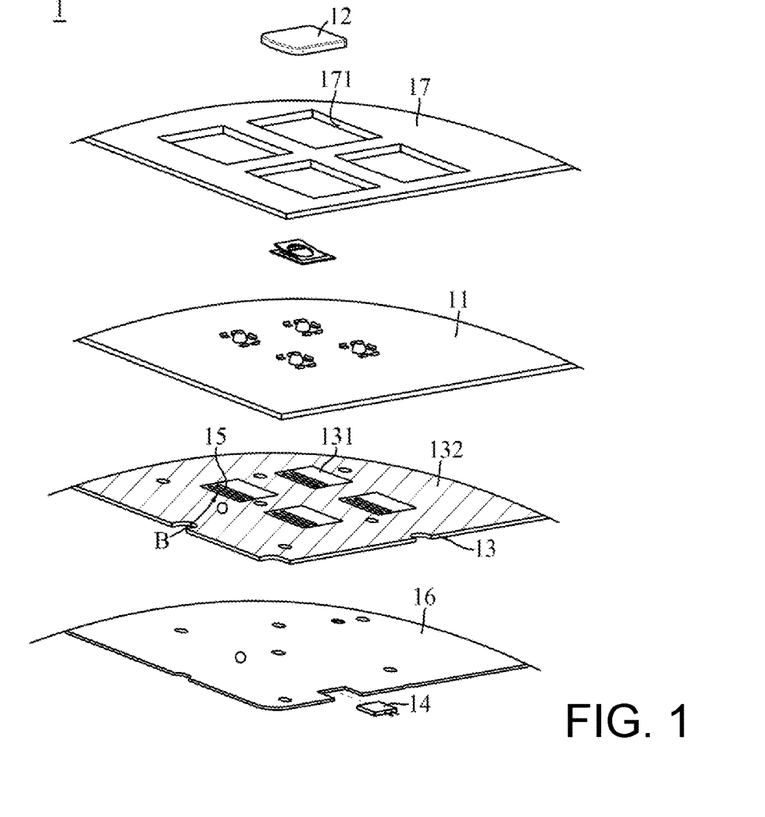
FIG. 1 is an explosion diagram of an illuminant keyboard according to the present invention.

Referring to FIG. 1, an explosion diagram of an illuminant keyboard according to the present invention is shown. As indicated in FIG. 1, the illuminant keyboard 1 of the present invention mainly includes a base plate 11, a transparent keycap 12, a transparent plate 13, a light source 14 (or a planar light source 16) and a plurality of protruding walls 15. The light source 14, such as an LED, refers to any illuminant body capable of providing the light to a local area. The planar light source 16, such as a light guide plate of the illuminant keyboard, refers to any planar illuminant body located right under the transparent plate 13 and capable of providing the light to a large area.

The transparent keycap 12 has a keycap pattern permeable to the light and may be used for identification purpose. The transparent keycap 12 may be disposed above the base plate 11 through a structure such as crater, scissor or metal elastic piece. Transparent keycap 12, when being pressed, may perform a vertical reciprocal movement with respect to the base plate 11. A space formed between the transparent keycap 12 and the base plate 11 has a first light traveling gap towards the area surrounding the transparent keycap 12. The light source 14 (or the planar light source 16) is capable of emitting a first light substantially proceeding towards the keycap pattern of the transparent keycap 12 and a second light substantially proceeding towards the first light traveling gap.

The transparent plate 13 is disposed between the light source 14 (or the planar light source 16) and the transparent keycap 12 and has a transparent region 131 allowing the first light and the second light to pass through. The transparent region 131 is located within a vertical projection area of the transparent keycap 12 on the transparent plate 13, and has a first boundary B. Besides, a light-shielding layer 132 may be coated on the surface of the transparent plate 13 other than the transparent region 131 to form a light-shielding layer on the illuminant keyboard. The light-shielding layer prevents the light from passing through the surface of the transparent plate 13 exclusive the transparent region 131, such that the illuminant keyboard 1 only illuminate in the area corresponding to the keycap pattern of the transparent keycap 12.

Figure 2:
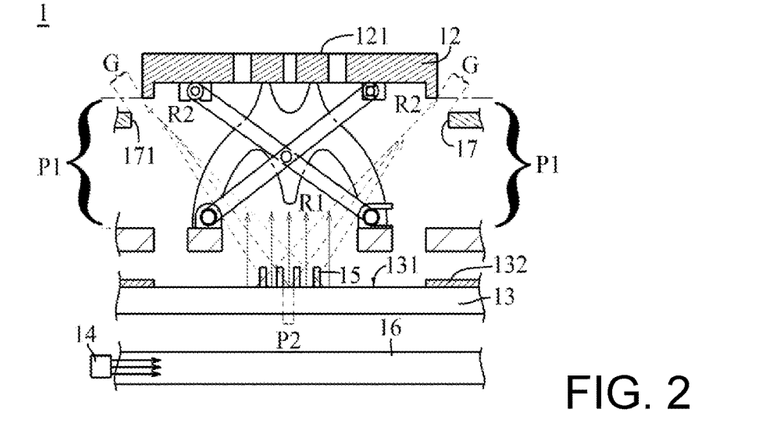
FIG. 2 is a partial cross-sectional view of an illuminant keyboard according to a first embodiment of the present invention.

The protruding walls 15 are substantially parallel to each other and neighboring to the first boundary B, and may selectively be made of a UV adhesive. As indicated in FIG. 2, the neighboring protruding walls 15 may change the color or intensity of the second light proceeding towards the first light traveling gap P1 so as to change the color or intensity of the light passing through the movable gap G, such that the color or intensity of the halo light surrounding the transparent keycap 12 can be effectively controlled.

Optionally, the protruding walls 15 may selectively be made of an opaque material and completely reduce the intensity of the second light. That is, the protruding walls 15, due to the properties of the material, may block the second light R2 and prevent it from reaching the movable gap G, hence effectively reducing the halo light surrounding the transparent keycap 12.

Optionally, the protruding walls 151 may selectively be made of a material with a designated color. The protruding walls 151 may have a first color, such that the second light passing through the movable gap G could have the first color. The halo light surrounding the transparent keycap 12 will be modulated with the designated color or a color different from that of the keycap pattern 121 to produce special visual effect.

Optionally, the height of each protruding wall 15 is between 10-50 μm. The interval between adjacent protruding walls 15 is between 10-50 μm.

A number of embodiments representing the technology of the present invention are exemplified below. To simply the disclosure of the present invention, in the embodiments exemplified below, the same designations are used to indicate the same or similar components, and the same or similar descriptions are disclosed in a simplified manner.

First Embodiment

Refer to FIG. 2 and FIGS. 3a-3f. FIG. 2 is a partial cross-sectional view of an illuminant keyboard according to a first embodiment of the present invention. FIGS. 3a-3h illustrate various arrangements of protruding walls of an illuminant keyboard according to the first embodiment of the present invention. In the illuminant keyboard 1 of the present embodiment as indicated in the diagram, the space between the transparent keycap 12 and the base plate 11 has a first light traveling gap P1 towards the area surrounding the transparent keycap 12. The light source 14 (or the planar light source 16) is capable of emitting a first light R1 substantially proceeding towards the transparent keycap 12 and a second light R2 substantially proceeding towards the first light traveling gap P1. When the second light R2 proceeds towards the first light traveling gap P1, the intensity of the second light R2 will be reduced. The first light R1 may reach the transparent keycap 12 through the second light traveling gap P2 without intersecting the protruding walls 15.

In the present embodiment, the illuminant keyboard 1 has a keyboard frame 17 having a receiving hole 171 for receiving the transparent keycap 12. The transparent keycap 12 may perform a vertical reciprocal movement in the receiving hole 171. The transparent keycap 12 and the wall of the receiving hole 171 of the keyboard frame 17 are separated by a movable gap G. Furthermore, the movable gap G and the first light traveling gap P1 are interconnected. Through above arrangement, part of the second light R2 proceeding towards the first light traveling gap P1 will pass through the movable gap G and exit to the outside. Under such circumstance, the halo light surrounding the transparent keycap 12 may become too strong, and the brightness of the halo light may be close to or even larger than that of the keycap pattern 121. Thus, the intensity of the light surrounding the transparent keycap 12 needs to be suitably reduced.

When a user wants to operate the illuminant keyboard, the user is towards the first side of the illuminant keyboard, and can view and identify the keycap pattern 121 from a correct angle. The vertical projection area of the transparent keycap 12 on the transparent plate 13 has a transparent region 131. The transparent region 131 has a first boundary B located between the central position of the transparent region 131 and the first side of the illuminant keyboard. Of the four boundaries of the transparent region 131, the first boundary B is closest to the user operating the illuminant keyboard 1.

In the present embodiment, each protruding wall 15 is protruded from an upper surface of the transparent plate 13 for reducing the intensity of the second light R2 emitted from the transparent plate 13. The formation of the protruding walls 15 on the transparent plate 13 may include following steps. Firstly, a UV adhesive layer is coated on the transparent plate 13. Then, a rubbing treatment and a curing treatment are sequentially performed on the UV adhesive to form the protruding walls 15 on the transparent plate 13.

Figure 3A:
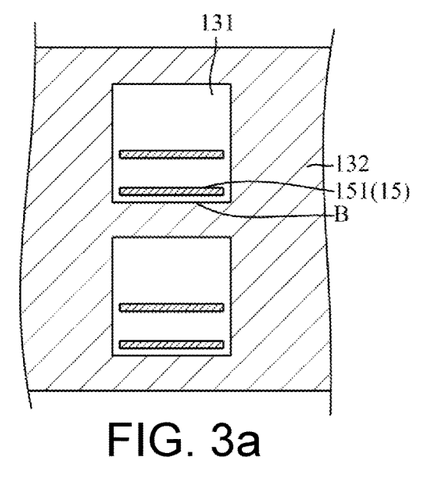
FIGS. 3a-3h are various arrangements of protruding walls of an illuminant keyboard according to the first embodiment of the present invention.
Figure 3B:
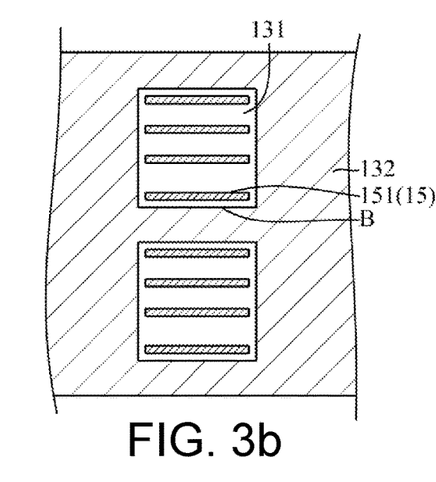

As indicated in FIG. 3a, the protruding walls 15 may be disposed within the lower portion of the transparent region 131 of the transparent plate 13 neighboring to the first boundary B. Each protruding wall 15 is I-shaped (or 1-shaped) and formed of a first wall 151. The first walls 151 are substantially parallel to each other and neighboring to the first boundary B. The neighboring protruding walls 15 are disposed at an interval to form a second light traveling gap. Preferably, the protruding walls 15 are parallel to the first boundary B and disposed at an interval of equal distance. As indicated in FIG. 3b, the protruding walls 15 formed of the first walls 151 may be disposed in the lower portion or the upper portion of the transparent region 131.

Figure 3C:
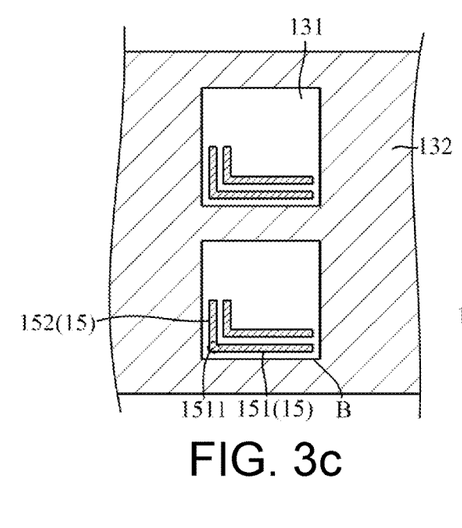

As indicated in FIG. 3c, the protruding walls 15 may be disposed in the lower portion of the transparent region 131 of the transparent plate 13 neighboring to the first boundary B. Each protruding wall 15 may be formed of a first wall 151 and a second wall 152 intersecting the first wall 151. The extending direction of the second wall 152 may be substantially perpendicular to that of the first wall 151. The first wall 151 has a first end point 1511. The second wall 152 extends and intersects the first walls 151 at the first end point 1511. The design of the first wall 151 intersecting the second wall 152 makes each protruding wall 15 L-shaped. As indicated in FIG. 3d, the second wall 152 of each protruding wall 15 may be extended to the upper portion from the lower portion of the transparent region 131.

Figure 3D:
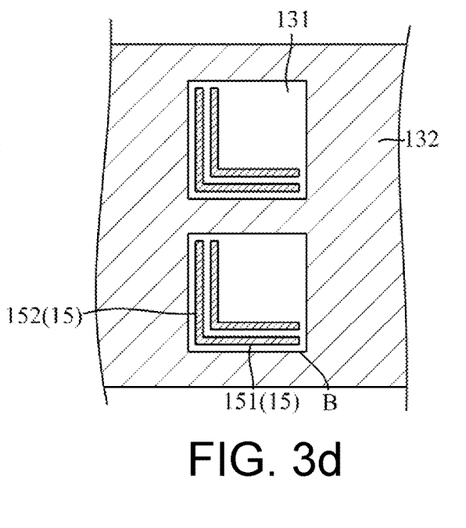

As indicated in FIGS. 3c and 3d, the protruding walls 15 preferably are disposed right under the keycap pattern on the numeric keypad at the right-hand side of the illuminant keyboard of a desktop computer. For example, protruding walls 15 are disposed right under the transparent keycap of the key "0". This is because when the user operates the transparent keycaps on the numeric keypad of the illuminant keyboard, the view-angle normally covers two walls at the bottom-left corner of each transparent keycap on the numeric keypad. Thus, through the protruding walls 15 of FIGS. 3c and 3d, the intensity of the halo light at the bottom-left corner of each transparent keycap on the numeric keypad of the illuminant keyboard could be reduced, and the user's operation on the transparent keycaps on the numeric keypad of the illuminant keyboard is made easier.

Figure 3E:
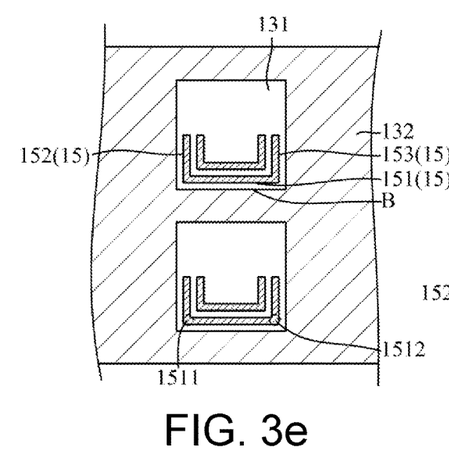

As indicated in FIG. 3e, each of the protruding walls 15 is disposed within the lower portion of the transparent region 131 of the transparent plate 13 neighboring to the first boundary B. Each protruding wall 15 is formed of a first wall 151, a second wall 152 and a third wall 153, wherein the first wall 151 intersects the second wall 152 and the third wall 153. The extending direction of the second wall 152 and the third wall 153 is substantially perpendicular to that of the first wall 151. The first wall 151 has a first end point 1511 and a second end point 1512. The second wall 152 extends and intersects the first walls 151 at the first end point 1511. The third wall 153 extends and intersects the second walls 152 at the second end point 1512. The design of the first wall 151 intersecting the second wall 152 and the third wall 153 respectively makes each protruding wall 15 U-shaped. As indicated in FIG. 3f, the second wall 152 and the third wall 153 of each protruding wall 15 may extend to the upper portion from the lower portion of the transparent region 131.

Figure 3F:
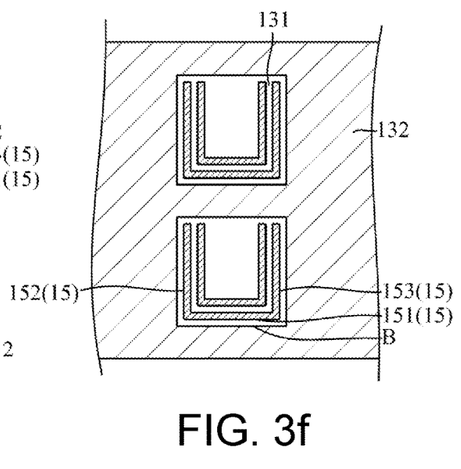

The protruding walls 15 of FIGS. 3e and 3f preferably are disposed right under the keycap pattern in the central key region of the illuminant keyboard of a desktop computer. For example, the protruding walls 15 are disposed right under the transparent keycaps of the keys "T", "Y", and "U". This is because when the user operates the transparent keycap in the central key region of the illuminant keyboard, the view-angle normally covers the wall at the bottom of each transparent keycap in the central key region. Thus, through the protruding walls 15 of FIGS. 3e and 3f, the intensity of the halo light at the bottom of each transparent keycap in the central key region of the illuminant keyboard will be reduced, and the user's operation on the transparent keycaps on the numeric keypad of the illuminant keyboard is made easier.

Figure 3G:
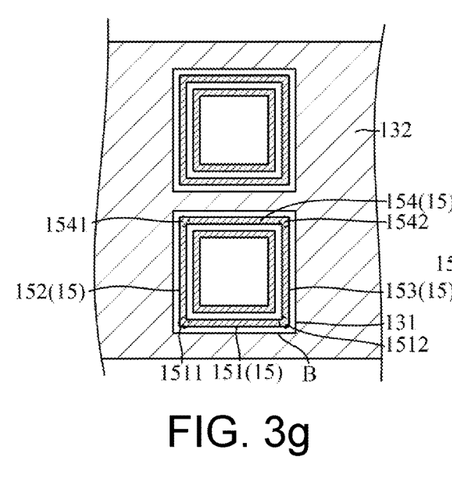
Figure 3H:
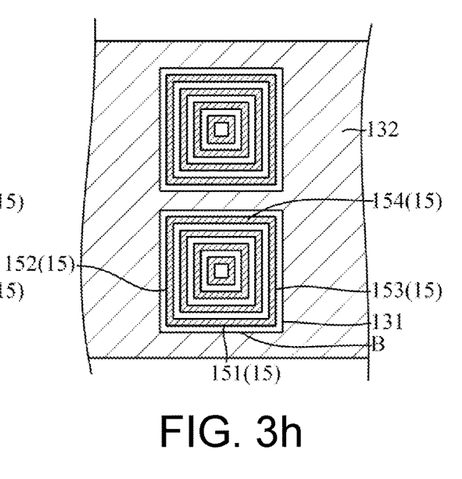

As indicated in FIG. 3g, each protruding wall 15 is disposed within the peripheral of the transparent region 131 of the transparent plate 13. Each protruding wall 15 is formed of a first wall 151, a second wall 152, a third wall 153 and a fourth wall 154. The extending direction of the second wall 152 and the third wall 153 is substantially perpendicular to that of the first wall 151. The extending direction of the fourth wall 154 is substantially parallel to that of the first wall 151. The two ends of the first wall 151 have a first end point 1511 and a second end point 1512, respectively. The second wall 152 extends and intersects the first walls 151 at the first end point 1511. The third wall 153 extends and intersects the second walls 152 at the second end point 1512. The two ends of the fourth wall 154 have a third end point 1541 and a fourth end point 1542, respectively. The design of the second wall 152 and the third wall 153 respectively intersecting the fourth wall 154 at the third end point 1541 and the fourth end point 1542 makes each protruding wall 15 square-shaped. The protruding walls 15 are arranged as a concentric structure. Preferably, the concentric structure takes the central position of the transparent region 131 as the center. As indicated in FIG. 3*h*, the protruding walls 15 may be disposed in any part of the transparent region 131, that is, from the peripheral to the central position of the transparent region 131.

Second Embodiment

Figure 4:
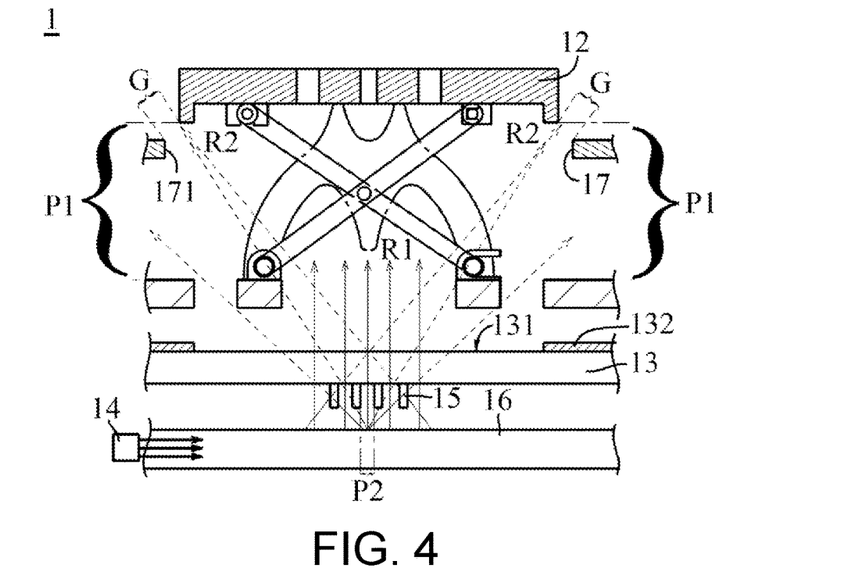
FIG. 4 is a partial cross-sectional view of an illuminant keyboard according to a second embodiment of the present invention.

Referring to FIG. 4, a partial cross-sectional view of an illuminant keyboard according to a second embodiment of the present invention is shown. In the illuminant keyboard 1 of the present embodiment as indicated in the diagram, each protruding wall 15 is protruded from a lower surface of the transparent plate 13 for reducing the intensity of the second light R2 not yet entering the transparent plate 13.

Third Embodiment

Figure 5:
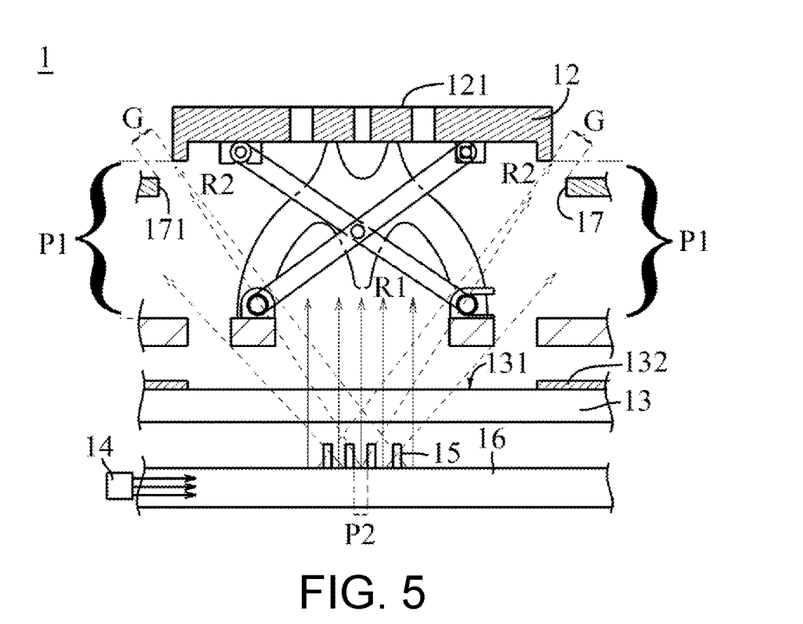
FIG. 5 is a partial cross-sectional view of an illuminant keyboard according to a third embodiment of the present invention.

Referring to FIG. 5, a partial cross-sectional view of an illuminant keyboard according to a third embodiment of the present invention is shown. In the illuminant keyboard 1 of the present embodiment as indicated in the diagram, each protruding wall 15 is protruded from the planar light source 16 and located right under the transparent region 131 for reducing the intensity of the second light R2 emitted from the planar light source 16.

In the present embodiment, the formation of the protruding walls 15 on the planar light source 16 may include following steps. Firstly, a UV adhesive layer is coated on the planar light source 16. Then, a rubbing treatment and a curing treatment are sequentially performed on the UV adhesive to form the protruding walls 15 on the planar light source 16.

Fourth Embodiment

Figure 6:
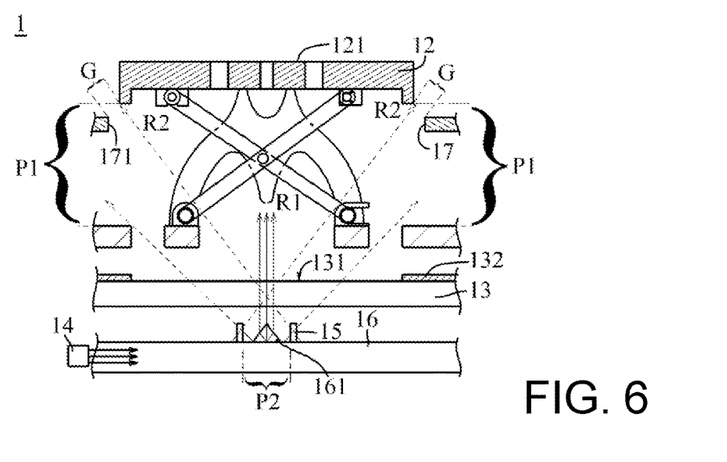
FIG. 6 is a partial cross-sectional view of an illuminant keyboard according to a fourth embodiment of the present invention.

Referring to FIG. 6, a partial cross-sectional view of an illuminant keyboard according to a fourth embodiment of the present invention is shown. In the illuminant keyboard 1 of the present embodiment as indicated in the diagram, each protruding wall 15 is protruded from the planar light source 16. The planar light source 16 further comprises a transparent prism 161 located in the second light traveling gap P2 between neighboring protruding walls 15. The transparent prism 161 changes the direction of the light passing through it to substantially proceeding towards the keycap pattern 121 of the transparent keycap 12. Through such arrangement, the second light R2 substantially proceeding towards the first light traveling gap P1 will be changed as the first light R1, such that the intensity of the light surrounding the transparent keycap 12 could be reduced. The intensity of the light can also be referred as the intensity of the halo light.

Fifth Embodiment

Figure 7:
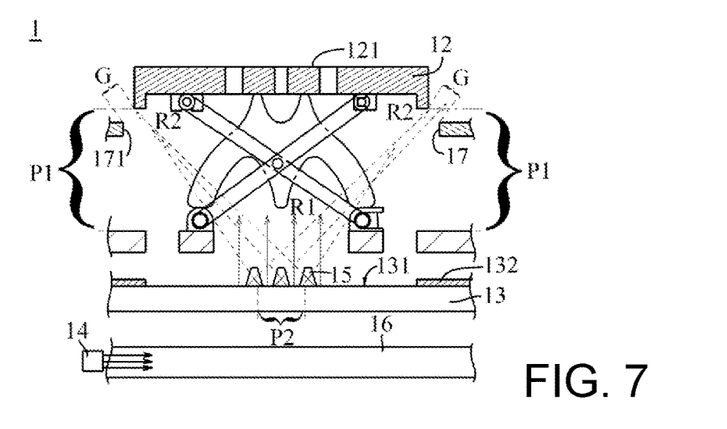
FIG. 7 is a partial cross-sectional view of an illuminant keyboard according to a fifth embodiment of the present invention.

Referring to FIG. 7, a partial cross-sectional view of an illuminant keyboard according to a fifth embodiment of the present invention is shown. In the illuminant keyboard 1 of the present embodiment as indicated in the diagram, the neighboring protruding walls 15 have opposite side slopes, such that the width of the cross-section shrinks upwards. The structure of the protruding walls 15 could be easily formed through a rubbing treatment.

Sixth Embodiment

Figure 8:
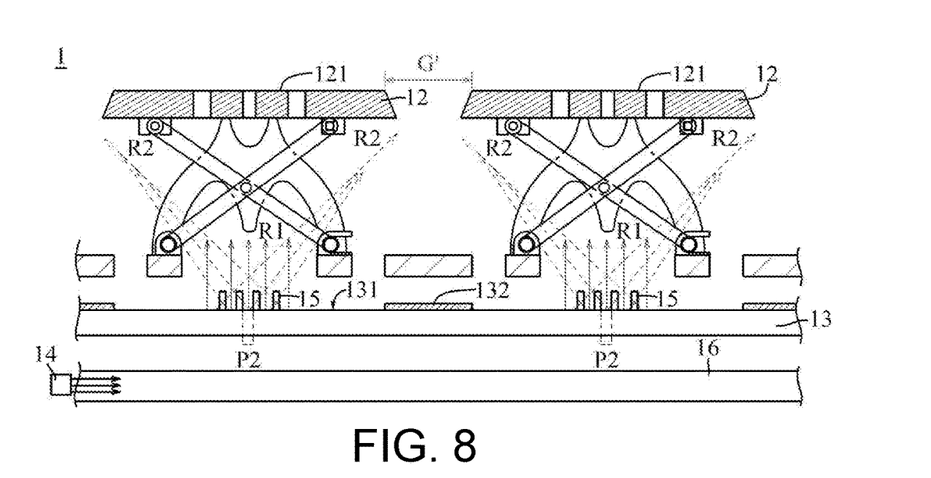
FIG. 8 is a partial cross-sectional view of an illuminant keyboard according to a sixth embodiment of the present invention.

Referring to FIG. 8, a partial cross-sectional view of an illuminant keyboard according to a sixth embodiment of the present invention is shown. As indicated in the diagram, the illuminant keyboard 1 of the present embodiment does not have a keyboard frame, and each protruding wall 15 may reduce the intensity of the light proceeding towards the surrounding area of two transparent keycaps 121, hence effectively reducing the intensity of the halo light in the movable gap G' which separates two illuminant keycaps 121.

To summarize, the illuminant keyboard of the present invention comprises a plurality of protruding walls substantially parallel to each other and disposed on the transparent plate or the planar light source for reducing the intensity of light. When the protruding walls are made of a transparent material with a designated color, the halo light surrounding the keycap will be modulated with the designated color. When the protruding walls are made of an opaque material, the intensity of the halo light surrounding a transparent keycap will be largely reduced, such that the illuminant keyboard will produce special visual effect to meet the requirements. The protruding walls may be either I-shaped, L-shaped, U-shaped or square-shaped for reducing the intensity of the light proceeding towards a specific direction.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An illuminant keyboard, comprising:
   a base plate;
   a light source capable of emitting a first light and a second light;
   a transparent keycap disposed above the base plate and a space formed therebetween, wherein a first light traveling gap towards an area surrounding the transparent keycap is formed within the space, the first light substantially proceeding towards the transparent keycap, and the second light substantially proceeding towards the first light traveling gap;
   a transparent plate disposed between the light source and the transparent keycap and comprising a transparent region allowing the first light and the second light to pass through, wherein the transparent region is located beneath the transparent keycap and the transparent region comprises a first boundary; and
   a plurality of protruding walls disposed within the transparent region, wherein each of the protruding walls comprises a first wall, the first walls are substantially parallel to each other and neighboring to the first boundary, two of the protruding walls most neighboring to each other are separated with an interval to form a second light traveling gap;

wherein the intensity of the second light will be reduced by the first walls when the second light proceeds from the light source towards the first light traveling gap;

and the first light reaches the transparent keycap through the second light traveling gap without intersecting the first walls.

2. The illuminant keyboard according to claim 1, wherein each of the protruding walls is protruded from an upper surface or a lower surface of the transparent plate.

3. A method for manufacturing the illuminant keyboard according to claim 1, wherein the method comprises following steps:
coating a UV adhesive layer on the transparent plate; and
sequentially performing a rubbing treatment and a curing treatment on the UV adhesive to form the protruding walls on the transparent plate.

4. The illuminant keyboard according to claim 1, wherein the light source is a planar light source.

5. The illuminant keyboard according to claim 4, wherein the planar light source further comprises a transparent prism located in the second light traveling gap between the protruding walls neighboring to each other for changing a direction of the light passing through the transparent prism to substantially proceed towards a keycap pattern of the transparent keycap.

6. A method for manufacturing the illuminant keyboard according to claim 4, wherein the method comprises following steps:
coating a UV adhesive layer on the planar light source; and
sequentially performing a rubbing treatment and a curing treatment on the UV adhesive to form the protruding walls on the planar light source.

7. The illuminant keyboard according to claim 1, further comprising a keyboard frame comprising a receiving hole in which the transparent keycap can move, wherein the transparent keycap and the keyboard frame are separated by a movable gap, and part of the second light proceeding towards the first light traveling gap will pass through the movable gap and exit to outside.

8. The illuminant keyboard according to claim 1, wherein the protruding walls comprise a first color, such that the second light passing through the protruding walls will be modulated with the first color.

9. The illuminant keyboard according to claim 8, wherein the protruding walls are made of a UV adhesive.

10. The illuminant keyboard according to claim 1, wherein a height of each of the protruding walls is between 10-50 μm.

11. The illuminant keyboard according to claim 1, wherein the interval between the protruding walls neighboring to each other is between 10-50 μm.

12. The illuminant keyboard according to claim 1, wherein the protruding walls neighboring to each other comprise opposite side slopes, such that a width of cross-section shrinks upwards.

13. The illuminant keyboard according to claim 1, wherein each of the protruding walls further comprises a second wall whose extending direction is substantially perpendicular to that of the first wall, the first wall comprises a first end point at which the first wall intersects the second wall, and design of the first wall intersecting the second wall makes each of the protruding walls L-shaped.

14. The illuminant keyboard according to claim 13, wherein each of the protruding walls further comprises a third wall whose extending direction is substantially perpendicular to that of the first wall, the first wall comprises a second end point at which the third wall intersects the first wall, and design of the first wall intersecting the second wall and the third wall respectively makes each of the protruding walls U-shaped.

15. The illuminant keyboard according to claim 13, wherein each of the protruding walls further comprises a third wall and a fourth wall; an extending direction of the third wall is substantially perpendicular to that of the first wall, an extending direction of the fourth wall is substantially parallel to that of the first wall, the first wall comprises a second end point at which the third wall intersects the first wall; two ends of the fourth wall comprise a third end point and a fourth end point at which the fourth wall intersects the second wall and the third wall respectively, and design of the first wall and the fourth wall respectively intersect the second wall and the third wall makes each of the protruding walls square-shaped.

16. The illuminant keyboard according to claim 15, wherein the protruding walls are arranged as a concentric structure taking a central position of the transparent region as a center.

17. The illuminant keyboard according to claim 1, wherein the illuminant keyboard comprises a first side, the transparent keycap comprises a keycap pattern, a user can view the keycap pattern from a correct angle when the user operates the illuminant keyboard from the first side, and the first boundary is located between a central position and the first side of the transparent region.

18. The illuminant keyboard according to claim 1, wherein the first walls all are parallel to the first boundary.

19. The illuminant keyboard according to claim 1, wherein each of the protruding walls can completely reduce an intensity of the second light, that is, each of the protruding walls can block the second light and prevent it from reaching the first light traveling gap.

20. The illuminant keyboard according to claim 1, wherein a surface of the transparent plate other than the transparent region comprises a light-shielding layer.

* * * * *